United States Patent [19]
Carey et al.

[11] Patent Number: 6,134,706
[45] Date of Patent: Oct. 17, 2000

[54] SOFTWARE BUSINESS OBJECTS IN A MULTI-LEVEL ORGANIZATIONAL STRUCTURE

[75] Inventors: James Carey, Rochester, Minn.; Brent Carlson, Sollentuna, Sweden; Timothy Graser, Rochester, Minn.; Anders Nilsson, Hagan, Norway

[73] Assignee: International Business Machines Corporation, Armonk, N.Y.

[21] Appl. No.: 09/038,025

[22] Filed: Mar. 11, 1998

[30] Foreign Application Priority Data

Aug. 14, 1997 [EP] European Pat. Off. .............. 97114037

[51] Int. Cl.[7] .............................. G06F 9/44; G06F 17/30
[52] U.S. Cl. ...................... 717/1; 705/1; 707/9; 707/104; 345/356
[58] Field of Search ........................... 707/1, 9, 10, 100, 707/102–104, 514; 705/7.1, 30, 35; 345/326, 333, 339, 356, 961, 965; 717/1

[56] References Cited

U.S. PATENT DOCUMENTS

| | | | |
|---|---|---|---|
| 5,642,511 | 6/1997 | Chow et al. ............................. | 395/701 |
| 5,860,005 | 1/1999 | Inoue ..................................... | 395/701 |
| 5,878,427 | 3/1999 | Waheed et al. ......................... | 707/103 |
| 5,890,132 | 3/1999 | Sanders ................................... | 705/7 |
| 5,890,161 | 3/1999 | Helland et al. ......................... | 707/103 |
| 5,893,107 | 4/1999 | Chan et al. .............................. | 707/103 |

OTHER PUBLICATIONS

E. Gamma et al., "Design Patterns: Elements of Reusable Object–Oriented Software", ISBN 0–201–63361–2, Addison–Wesley Professional Computing Series, pp. 223–232 and 315–323, Copyright 1995 by Addison–Wesley Publishing Company.

Bjarne Stroustrup, "The Design and Evolution of C++," AT&T Bell Laboratories, Addison–Wesley ISBN 0–201–54330–3, 1994, p. 301.

Bohrer et al, "The San Francisco project: an object–oriented framework approach to building business applications," Proceedings of the Twenty–First Annual International on Computer Software and Applications Conference, COMPSAC '97, Aug. 13–15, 1997, pp. 41.

IBM SanFrancisco Technical Summary & Hardware and Software Requirements [online]. IBM Corporation, 1997 [retrieve on 1999–06–22]. Retrieved for the Internet:<htp://www.software.ibm.com/ad/sanfransico/prd _summary.html & /sanfransico/require.html>, Jul. 1997.

Beck et al, "Industrial experience with design patterns," Proceedings of the 18th International Conference on Software Engineering, Mar. 25–30, 1996, pp. 103–114.

Czech et al, "Object oriented organizational modeling," Proceedings of the Twenty–Eighth Hawaii International Conference on System Sciences, Jan. 3–6, 1995, vol. V, pp. 353–362.

Menga et al, "An object–oriented framework for enterprise modelling," Conference Record of the 1994 IEEE on Industry Applications Society Annual Meeting, Oct. 2–6, 1994, pp. 1879–1886 vol. 3.

Glenn Andert, "Object frameworks in the Taligent OS,"Digest of Papers of Compcon Spring '94, Feb. 28–Mar. 4, 1994, pp. 112–121.

*Primary Examiner*—Tariq R. Hafiz
*Assistant Examiner*—Tuan Q. Dam
*Attorney, Agent, or Firm*—Owen J. Gamon; Eamon J. Wall

[57] ABSTRACT

The present invention relates to a method of developing a software system using Object Oriented Technology. The present invention addresses the problem of providing a technical foundation for the development of software applications using Object Oriented Technology and frameworks. The present invention solves this problem with a framework allowing the modeling of businesses with a multiple level organizational structure. The present invention is applicable in the technical field of application development of software systems, e.g. for a business application as Financial or Logistic and Distribution, wherein it is the purpose of frameworks to provide significant portions of the application that are common across multiple implementations of the application in a general manner, easy to extend for specific implementation.

9 Claims, 5 Drawing Sheets

SOFTWARE BUSINESS OBJECTS IN A MULTI-LEVEL ORGANIZATIONAL STRUCTURE

The present application is related to the following commonly assigned co-pending applications filed on the same date as the present application, each of which is herein incorporated by reference:

U.S. Ser. No. 09/038,024 by Kathryn Bohrer et al., entitled "A Method of Developing a Software System Using Object Oriented Technology";

U.S. Ser. No. 09/038,352 by Brent Carlson et al., entitled "A Method of Using Decoupled Chain of Responsibility";

U.S. Ser. No. 09/038,351 by James Carey et al., entitled "Framework for Business Applications Providing Financial Integration";

U.S. Ser. No. 09/038,349 by James Carey et al., entitled "Framework for Business Applications Using Cached Aggregate and Specification Key";

U.S. Ser. No. 09/041,114 by Brent Carlson et al., entitled "Method of Error Handling in a Framework"; and U.S. Ser. No. 09/038,381 by Anders Nilsson, entitled "A Method of Locating Software Objects in Different Containers".

FIELD OF THE INVENTION

The present invention relates to a method of developing a software system using Object Oriented Technology and frameworks, in particular relates to a method for providing a framework, allowing the modeling of businesses with a multiple level organizational structure.

DESCRIPTION OF THE RELATED ART

In order to maintain or enlarge their competitiveness, enterprises of almost every type of business all over the world have to rework and bring up to date their information technology to meet customer's requirements and thus to be successful in the market. But keeping an information system based on traditionally developed software up to date is at least an expensive undertaking, and in many cases it is an unsolvable problem. Object Oriented Technology or simply Object Technology, often abbreviated "OOT" or simply "OT", has the technical potential to overcome the problems associated with development, maintenance, and extension of software applications within a company's information system and to provide interoperability and adaptability across multiple applications and hardware platforms.

Object Oriented Technology describes a method for the development of operating software as well as application software for a computer system. Contrary to the traditional, non object oriented ways of developing software, Object Oriented Technology comprises and uses preengineered "methods" and "objects" for the development of software, comparable to tools and parts for the development of an automobile.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These classes are usually stored in a software library or a so called "class library". A class library is simply a collection of several classes stored together in a special filing format called a library.

In Object Oriented Technology an "object" is a self-contained piece of software consisting of related data and procedures. Data means information or space in a computer program where information can be stored, e.g. a name or an inventory part number. Procedures are parts of a program that cause the computer to actually do something, e.g. the parts of a program which perform calculations or the part of a program that stores something on a computer disk. In Object Oriented Technology, an object's procedures are called "methods".

The concept of an object being a self-contained piece of software having data and procedures inside itself is a new way of developing software. In non object oriented software, most of the data for an entire program is often grouped together near the beginning of the program, and the procedures then follow this common pool of data. This conventional method worked okay for smaller programs, but as soon as a piece of software started to grow and become somewhat complex, it become increasingly difficult to figure out which procedures were using which data. This made it quite difficult and expensive to debug or change traditional software programs.

In Object Oriented Technology it is generally easier to debug, maintain, and enhance object oriented software. The three most popular object oriented programming languages are probably "C++", "JAVA", and "Smalltalk". The concept that both data and methods are contained inside an object is called "encapsulation". Part of the concept of encapsulation is that an object has a predictable way of communicating with other objects, a so called predictable "interface" or sometimes also called the method contract.

Provided that interface will not be changed, the code or methods inside the object can be changed without disrupting other objects' ability to interact with that object. For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology the term "inheritance" is used to communicate the concept that one object can inherit part of its behavior and data from another object, e.g. since an employee is a type of person, an EMPLOYEE object might inherit the characteristics of a PERSON object, such as having name, birth date, and address data, as well as an EMPLOYEE object might inherit methods for updating and displaying these data.

Even if an object inherits some of its characteristics from other objects, that object can, and usually would, also have its own non-inherited characteristics, e.g. whereas a PERSON object would have an inheritable method to display a person's address, a PERSON object would probably not have a method for displaying paycheck history, since not all persons get paychecks. Because an EMPLOYEE object could not inherit this method from a PERSON object, an EMPLOYEE object would have to define its own method for displaying paycheck history.

Although Object Oriented Technology clearly seems to be the most sophisticated way for the development, maintenance, and extension of software applications, many companies developing software applications are concerned about the cost and risks involved with the rework of existing applications and with the construction of new applications using Object Oriented Technology. For those software application developers, a technical foundation for software applications has to be built as a tool using Object Oriented Technology as the basis, allowing each developer to develop highly unique software products. This technical foundation is formed by frameworks comprising the basic application structure which software application developers previously had to develop by themselves.

In Object Oriented Technology the term "framework" is used to describe a reusable set or collection of classes which work together to provide a commonly needed piece of functionality not provided by any of the individual classes inside the framework. Thus a framework defines a specific way in which multiple objects can be used together to perform one or more tasks which no single object performs. In other words, a framework is a reusable, predefined and preengineered bundle of several objects which address a recurring programming problem.

Frameworks provide a way of capturing a reusable relationship between objects, so that those objects do not have to be reassembled in that same relationship every time they are needed. Frameworks provide a way of grouping multiple objects together to perform some function which should not have to be thought through each time at the underlying object level. For example, a PRINT framework would consist of all the objects necessary for a programmer to easily print something on any printer, and would probably include objects for printer selection, spooling to disk or error detection as "out of paper" . Frameworks can be regarded as an group of software objects which contain a technical foundation for a software application. For example in the business field of Financial, Logistic and Distribution or Production. Although a framework represents a skeleton of a software application, usually a framework is not an executable software program.

By providing frameworks as the technical foundation for developing software applications, the following problems have to be addressed:

Applications have to support all hardware platforms and related software operating systems relevant on the market. Applications have to fulfill the requirements related to client/server configurations including the requirement for graphical user interfaces and windowing techniques. Also, applications have to offer internet compatibility and access on demand. Furthermore applications have to provide integrated solutions with respect to installed software.

Known from the prior art, see e.g. E. GAMMA et al: "Design Patterns: elements of reusable object-oriented software", Addison-Wesley, 1995, ISBN 0-201-63361-2, are two object oriented design patterns, "Chain of Responsibility" and "Strategy".

A requirement of frameworks is to allow the modeling of businesses with a multiple level organizational structure. It is necessary, given the requirements of business processes, that each company within an organizational structure should be able to tailor which information it shares with a parent organization and which information is specific to itself. In the case of an object oriented framework, this requirement means that Business Objects (BOs) must be defined in such a way that they can be selectively shared among the parent and child companies of an organizational structure. Specifically, if a parent company introduces a set of instances of a given type of business object, child companies must have the option to introduce their own sets of the given BOs, isolating themselves from the parent's set, share the parent's set entirely with no set being defined at their level, share the parent's set but "override" certain BOs with those contained by a set at their own level, share the parent's set but "hide" certain BOs in the set, and partially share the BOs themselves in the parent's set, that is, a subset of the BOs data should be public and shared by the parent with child companies while the remaining data should be private and specific to each company.

Within the accompanying figures, representation standards for classes, objects, relationships etc. are used at least partly according to Grady Booch: "Object-Oriented Analysis and Design with Applications", second edition, The Benjamin/Cummings Publishing Company, Ind., Redwood City, Calif., USA.

SUMMARY OF THE INVENTION

It is an object of the present invention to provide a technical foundation for the development of software applications using Object Oriented Technology which overcomes the above discussed problems.

It is a further object of the present invention to provide a framework which allows the modeling of businesses with a multiple level organizational structure.

The present invention solves this object with methods and apparatus as layed down in enclosed independent claims. Particular embodiments of the present invention are presented in the respective dependent claims.

Furthermore, the present invention provides a framework to be used for developing a software system, e.g. for a business application, said framework comprising a number of objects which are to be processed by a computer system, characterized in that an organizational structure is represented by company objects organized in a tree structure, said company objects implement a property container interface providing an ability that specific data may be added to its instantiated object by a name, controller objects are attached to said company objects as properties.

To address all of the sharing requirements mentioned above, an abstract controller class is defined to present the common methods defined for the access of the controlled business objects. The interface presented by this abstract class is used by clients to access business objects from a controller.

Subclasses of the abstract controller class then provide the ability to isolate or merge layers of the company tree structure with respect to the controlled objects, i.e. the objects contained by the controller, attached to the company hierarchy, effectively creating logical views of the controlled objects over the company hierarchy without explicit knowledge or action by the client.

DETAILED DESCRIPTION

Figure 1:
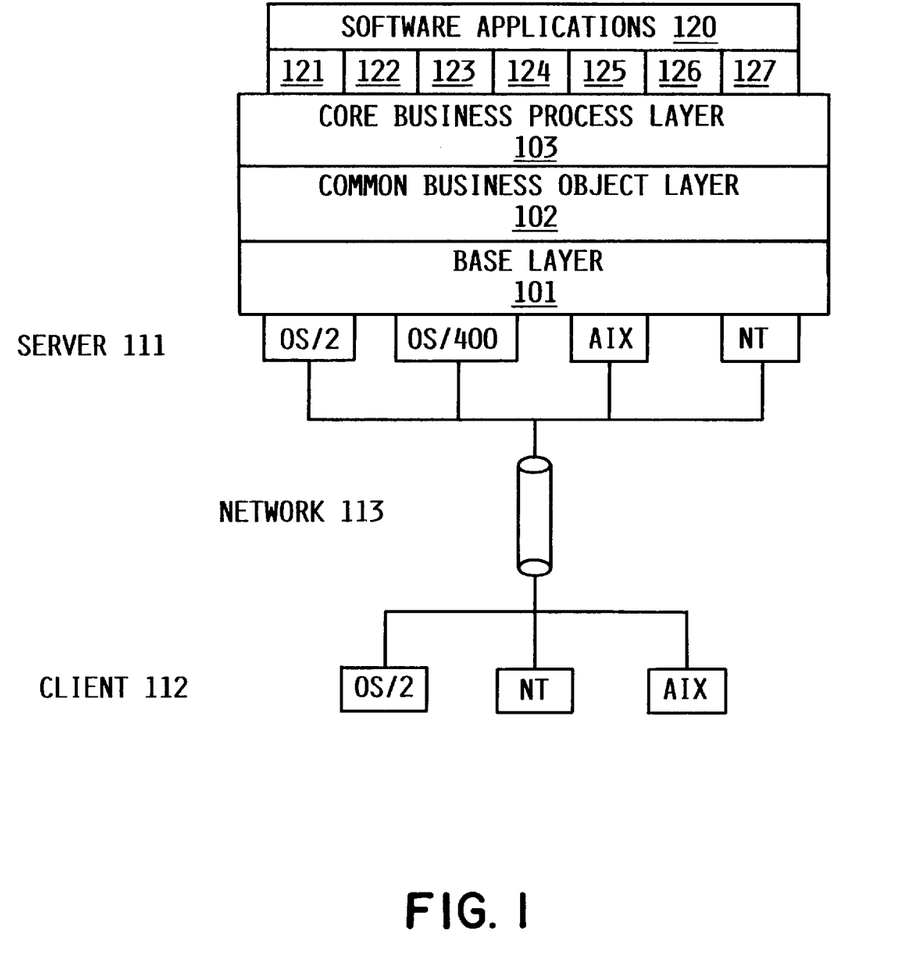
FIG. 1 shows a four layer schema from which software application can be developed using the present invention.

Developing software applications using the subject of the present invention as a development tool can be regarded as built up of four layers as shown in FIG. 1.

The lowest layer is the base layer 101. The base layer 101 provides and manages the interface with the server hardware 111 which is potentially running under different operation systems such as OS/2, OS/400, AIX, and NT. The server hardware 111 is connected with client hardware 112 via a communication network 113. The client hardware 112 may also potentially running under different operation systems such as OS/2, NT, and AIX. The embodiment shown in FIG. 1 shows the development of the server portion of a client/server application only.

The Base layer 101 represents the technical foundation for the higher level objects including many functions near to an operating system such as finding objects, keeping track of their names, controlling access to them, resolving conflicts, security administration, and installation. The Base layer 101 also includes the so called Object Model Classes which provide a consistent model for building objects while hiding the complexity of the underlying infrastructure from the software application developer. The Base layer 101 can be regarded as a kind of lower middleware necessary for the application of the Object Technology above it using the interface functionality provided by the Base layer 101.

Above the Base layer 101 there is a layer comprising Common Business Objects 102. This Common Business Object layer 102 provides a large number of objects which perform functions commonly needed within a business application, e.g. date and time, currency, address, units of measure, and calendar. These Common Business Objects represent the building blocks from which software application developers can select and create business applications, e.g. these Common Business Objects can be copied and extended to perform new functions as for example the date and time object can be extended to handle the Chinese calendar.

The layer 103 above the Common Business Objects layer 102 already comprises Core Business Processes and can be regarded as the Core Business Process layer 103. Although this layer 103 usually does not provide executable code, within this layer 103 the business software applications developed using the present invention begin to take shape. Each Core Business Process layer is built for one specific type of application, as for example General Ledger or Warehouse Management.

This Core Business Process layer 103 can be regarded as an upper middleware which—although not a complete software application program—already contains the basic functions which all of the application programs of this type require. It is the Core Business Process layer 103 which creates the application frameworks, wherein some of the Common Business Objects are linked to a large number of objects specific to the type of framework being built, e.g. Warehouse Management. The resulting framework is constructed in a way to contain commonly used functions as well as to be easy to extend.

On top of the above described three layer model the application software is located, created by the software application developer and representing executable code. It is the choice of a software application developer whether to use only the base layer 101, the base layer 101 and the Common Business Object layer 102, or all three layers 101, 102, and 103 for the development of his software application. In every case he has to develop a remaining part of the application by himself and therefore every resulting software application program will be a completely unique product.

It has to be noted that the subject of the present invention is represented within the three layer model 101, 102, and 103 and is not represented by the executable code of the software application 121 developed using the present invention.

Figure 2:
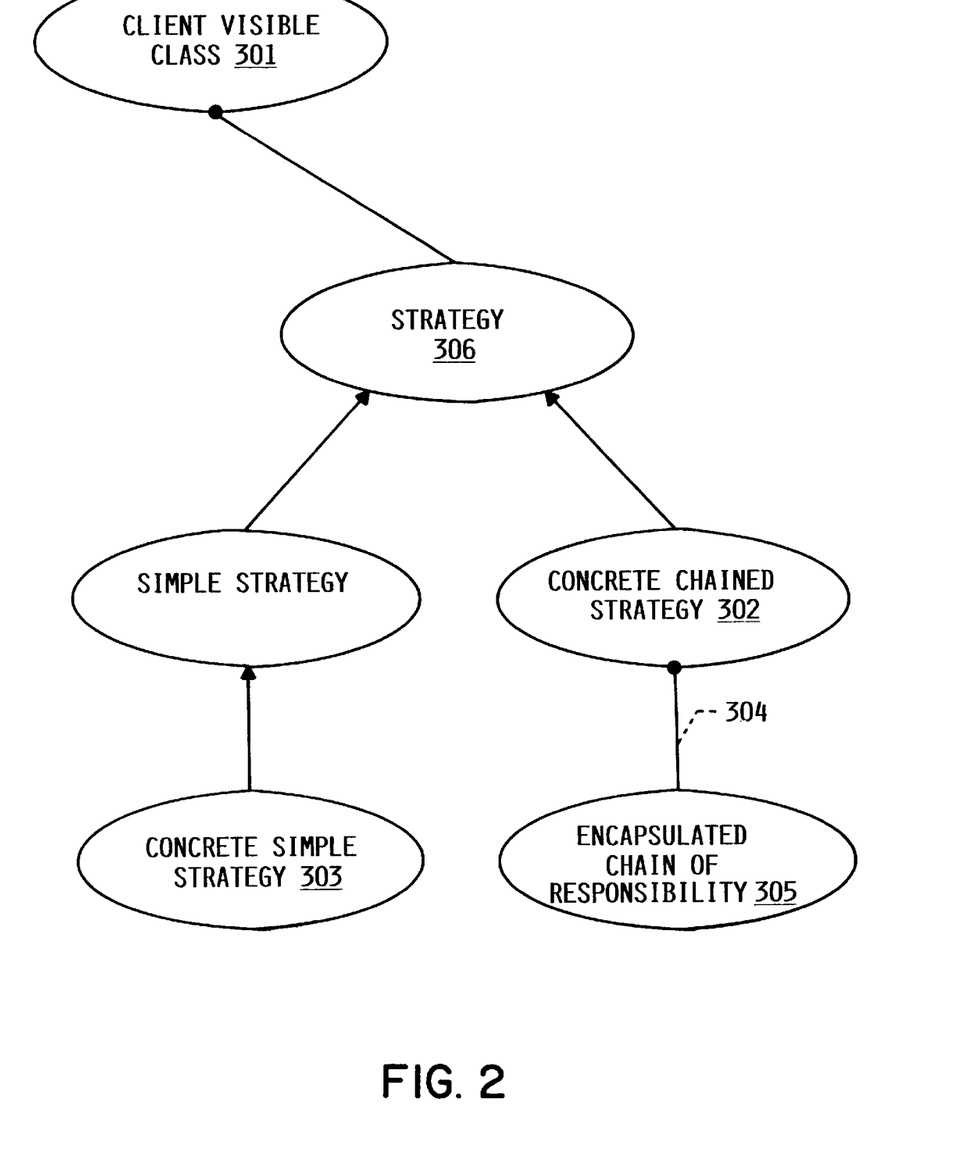
FIG. 2 shows a class representation of the chain of responsibility driven strategy.

FIG. 2 shows a class representation of the chain of responsibility driven strategy. The client visible class 301) can be configured with either a concrete chained strategy 302 or a concrete simple strategy 303, because both types of classes support the strategy interface 306. This allows the application developer or user to tune a particular client visible class instance 301 for performance, when using a concrete simple strategy 303, or for flexibility, when using a concrete chained strategy 302. Policy instances held as properties, e.g. policy B 232 in FIG. 2, may be instances of concrete chained strategy 302, thus providing even greater flexibility. This flexibility can be extended indefinitely, although with corresponding reductions in performance. The relationship 304 between the concrete chained strategy 302 and an encapsulated chain of responsibility 305 may vary based on the actual usage, for example concrete chained strategy 302 implements encapsulated chain of responsibility 305 directly, or concrete chained strategy 302 holds one or more encapsulated chain of responsibility 305 objects, or concrete chained strategy 302 refers to one or more encapsulated chain of responsibility 305 objects held by property on other objects.

To address all of the sharing requirements according with the allowance of modeling of businesses with a multiple level organizational structure mentioned above, an abstract controller class is defined to present the common methods defined for the access of the controlled business objects. The interface presented by this abstract class is used by clients to access business objects from a controller. Two concrete subclasses of controllers are derived from this abstract controller class.

The first, called a "root" controller, is a controller that holds a collection of business objects and provides methods for creating and deleting business objects in that collection. Only those business objects in the root controller's collection can be accessed through this controller. Thus, when a company keeps a set of BOs in a root controller it is isolating itself from its parent's set (if one exists).

The second concrete subclass is an "aggregating" controller. Like the root controller, an aggregating controller holds a collection of business objects that it controls itself, but unlike the root controller, it has access to a "parent" controller which may be either a root or another aggregating. When business objects are accessed through an aggregating controller, the controller first checks its own collection for the requested business object (business objects are usually identified with a unique ID which is used to key them within the controller structure). If the requested business object is found there it is returned, if not the parent controller is retrieved and asked to return the requested business object. This behavior will repeat until the requested business object is found or until a root controller is encountered. This behavior allows an aggregating controller to appear to a client to have a "logical" scope that includes the business objects that it controls directly as well as those in its chain of parent controllers. The aggregating controller is also able to "override" a parent's business object with a matching one (matching unique ID) in its own collection.

A specialization of the aggregating controller is a subclass known as a "hiding" controller. In addition to providing all functionality of the aggregating controller, the hiding controller maintains a collection of business objects held by parent controllers that it wishes to "hide", typically by unique ID. When a business object with a given ID is requested from a hiding controller, the controller first checks its collection of "hidden" objects. If the object is found there, the controller indicates to the client that the requested business object is not found. If the object is not in the hidden object collection, it will be retrieved in the normal aggregating controller fashion. Hiding controllers allow a child company to hide specific business objects in the parent company's set while sharing others.

The type of recursive search used by aggregating controllers is a use of the "Chain of Responsibility" pattern (see E. GAMMA et al: "Design Patterns: elements of reusable object-oriented software", Addison-Wesley, 1995, ISBN 0-201-63361-2). In the case of aggregating controllers the links of the chain are not direct. Instead, an aggregating controller accesses its parent by first going to its associated company (for which a direct link is held), accessing the parent company through the organizational tree structure of companies, and then using the property container interface of the parent company to request the parent controller. This modelling of the relationship between parent and child controllers allows controllers to be added, removed or changed at any level of the organizational structure without adversely affecting controllers at other levels, i.e. requiring aggregating controllers at lower levels to rebuild parent controller links when a new controller is added to a to a company between it and its current parent controller.

Figure 3:
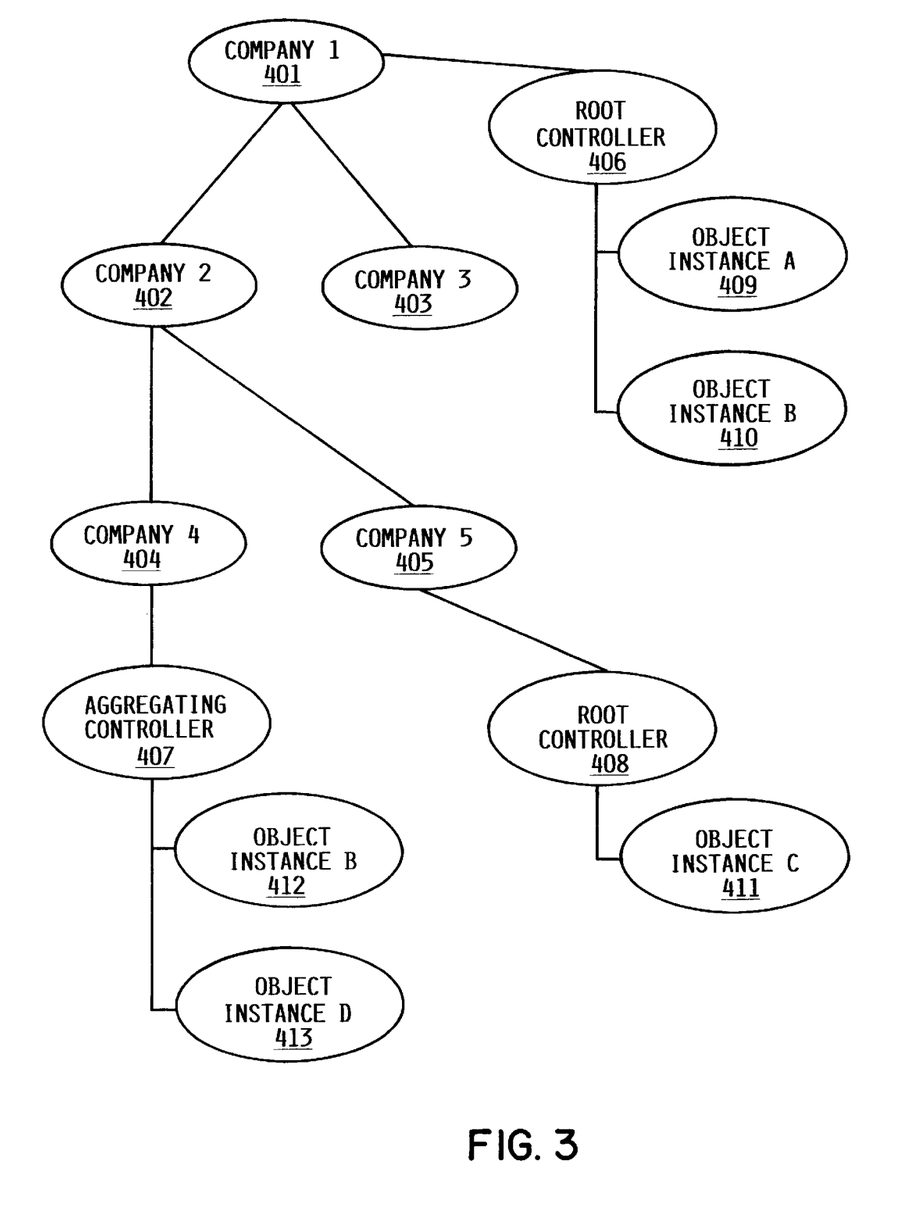
FIG. 3 shows a concrete example of Root and Aggregating controllers and their interaction.

FIG. 3 shows a concrete example of Root and Aggregating controllers and their interaction. In this example, a client using company 1 401 works with a Root controller 406 and sees controlled object instances A 409 and B 410. A client using either company 2 402 or company 3 403 works with the same Root controller 406 through the behavior of property controllers implemented by the company class. A client using company 4 404 works with aggregating controller 407 and sees controlled object instances A 409 (retrieved from the Root controller 406), B 412 (retrieved locally, thereby overriding the instance B 410 on the root controller) and D 413 (retrieved locally). A client using company 5 405 works with Root controller 408 and sees controlled object instance C 411 only. Object instances A 409 and B 410 are not visible in this case because the Root controller terminates the retrieval chain.

Figure 4:
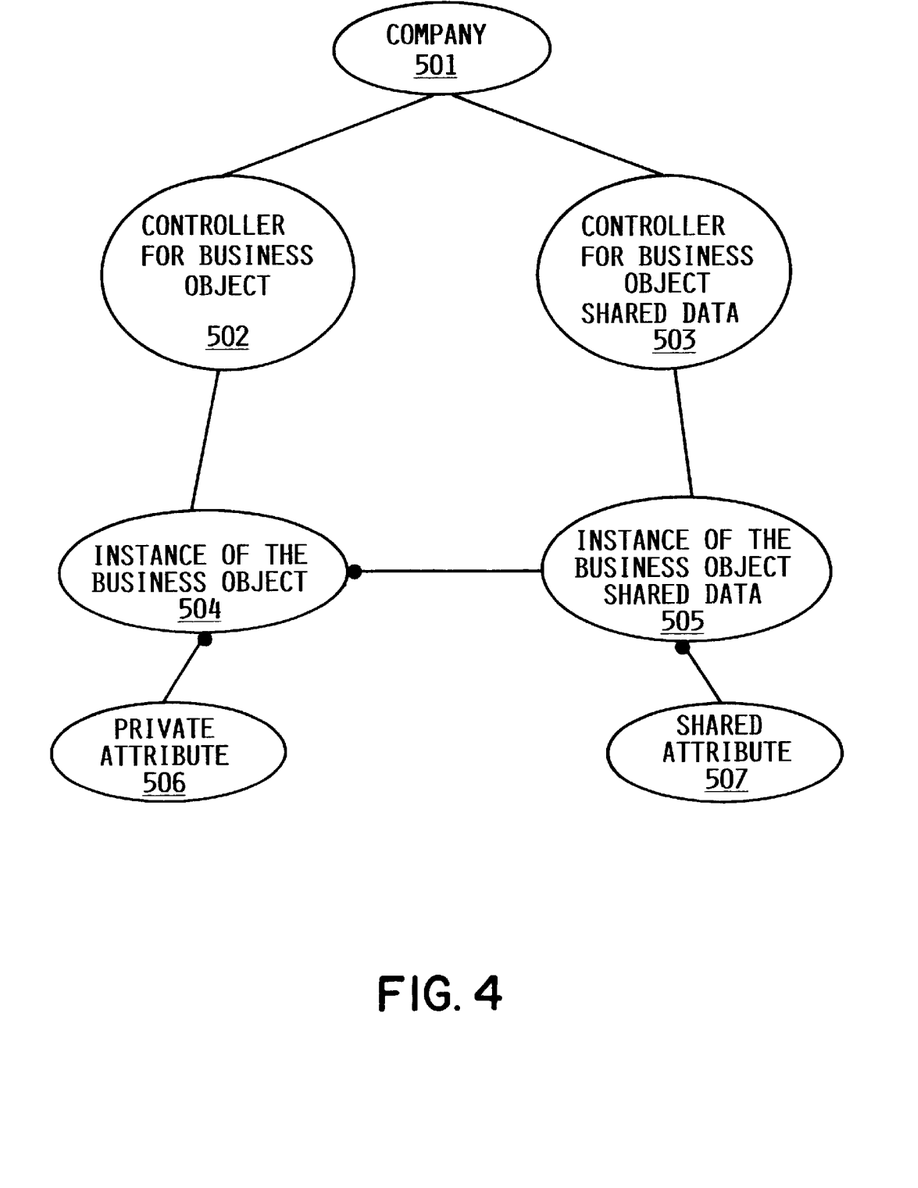
FIG. 4 shows a combination of two controller types.

By combining two controller types and specifying their interaction when creating instances of their controlled classes, it is possible to implement business objects whose data is partially shared and partially private. As shown in FIG. 4, one controller type 502 contains instances of the business object 504 (where private data is located) and the other controller type 503 contains instances of the business object's shared data 505. Instances of the business object shared data 505 are created and maintained as any other framework object. An instance of the business object 504 may not be created unless an instance of the business object shared data with the same key (typically ID) already exists. The business object 504 then retrieves the business object shared data object from its controller 503 using its common key (ID) and maintains a reference to that object. Thus, the business object 504 logically represents the full behavior of the business object through its composite relationship. Retrieval of the controller for business object shared data 503 follows all the rules of property retrieval described earlier.

As described earlier, the business object 504 holds attributes that are private, such as object 506, while the associated shared data object 505 holds attributes that are shared such as object 507. The business object provides interfaces for setting and retrieving all private data as well as all shared data, thus supporting the full behavior of the compound business object. The business object 504 implements client calls to set and retrieve shared attributes (such as 507), by dereferencing its associated shared data object 505 and forwarding the information for the call to the associated accessor method for the attribute (507) on the shared data object 505, thereby setting the attribute on the shared data object in the case of a set or returning the attribute to the client in the case of a retrieve. The business object 504 implements client calls to set and retrieve private attributes (such as 506) by setting or retrieving the directly contained private attribute, the shared data object 505 is not involved in this case. The business object 504 also implements a method that returns a list of all shared data methods. This list can be used by a maintenance Graphical User Interface (GUI), for example to control access to the set methods for shared data.

Both the business object 504 (see property access diagram) and the shared data object 505 implement methods for setting and retrieval of attributes as properties. Attributes held as properties that are meant to be shared are held as properties on the shared data object 505. Attributes held as properties that are meant to be private are held as properties on the business object 504. Retrieval of attributes held as properties involves the following algorithm: The client calls a property retrieval method on the business object 504 passing the property ID of the attribute that is to be retrieved. If a property with matching ID is found on the business object 504, the attribute is returned to the client. If a property with matching ID is not found on the business object 504, the business object 504 dereferences the associated shared data object 505, and calls the appropriate property retrieval method on it, passing the property ID given by the client, the value returned from that call is then returned to the client.

An enhancement used in the frameworks to the property attribute resolution algorithm just described is to give the business object the ability to be placed in a hierarchy by adding a "parent" reference to another business object in each business object.

Figure 5:
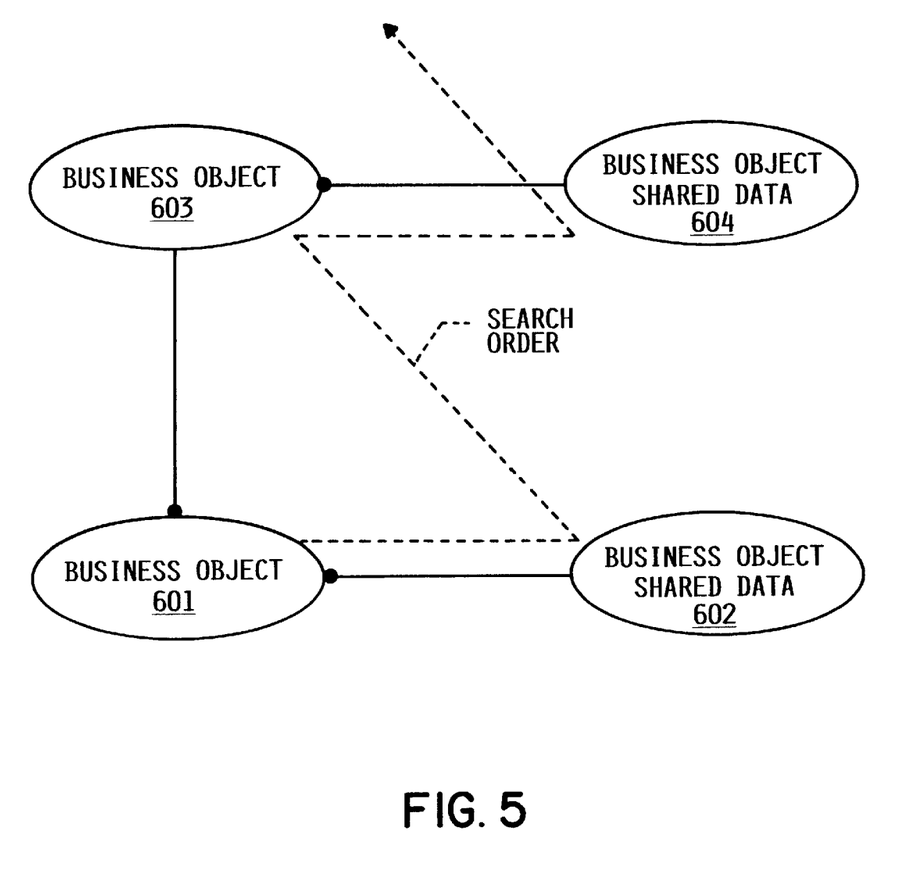
FIG. 5 shows a method for property attribute retrieval when the business object has a hierarchy parent

The method for property attribute retrieval when the business object has a hierarchy parent is shown in FIG. 5 as follows: The client calls a property retrieval method on the business object 601 passing the property ID of the attribute that is to be retrieved. If a property with matching ID is found on the business object 601, the attribute is returned to the client. If a property with matching ID is not found on the business object 601, the business object 601 dereferences the associated shared data object 602 and calls the appropriate property retrieval method on it. If a property with matching ID is found on the shared data object 602, the attribute is returned to the client. If a property with matching ID is not found on the shared data object 602, the business object 601 then dereferences its parent business object 603 and calls the appropriate property retrieval method on it, causing the algorithm to be repeated on the parent object. Thus if the property is not found on the parent business object 603, the shared data object 604 will be tried, followed by the parent of 603 (if one exists). The retrieval algorithm terminates when either the property is found or the current business object in the search does not have a parent reference.

What is claimed is:

1. A computer-implemented framework mechanism of object-oriented technology for developing application software in a computer system, said framework comprising:

a plurality of business objects organized in a tree structure, wherein said business objects represent an organizational structure; and a first controller, for controlling a first group of said plurality business objects including as a property said first controller;

said first controller having associated with it a parent controller, said parent controller controlling a second group of business objects including as a property said parent controller;

said first controller providing access, by object name, to said first and second groups of business objects in response to a client instantiation of a named object.

2. The framework according to claim 1, wherein: said first controller comprises an aggregating controller and said parent controller comprises one of a root controller and an aggregating controller.

3. The framework according to claim 1, wherein a controller class including said first controller and said parent controller provides an interface for said client to access, delete or create objects of a business object class represented by a business object within said first and second groups of business objects.

4. The framework according to claim 1, wherein said first controller and said parent controller occupying different hierarchical levels within said tree structure.

5. The framework according to claim 1, wherein said first controller exhibits a hiding behavior, said hiding behavior selectively preventing instances of named objects within said first and second groups of business objects from being provided to said client.

6. The framework according to claim 5, wherein in the case of an instance of a business object included within both of said first and second groups of business objects, only a local named business object is provided to said client.

7. The framework according to claim 6 wherein said local business object comprises the named business object within said first group of business objects.

8. A computer-implemented framework mechanism of object-oriented technology for developing application software in a computer system, said framework comprising:

a plurality of business objects organized in a tree structure, wherein said business objects represent an organizational structure; and an aggregating controller, for controlling a first group of said plurality business objects including as a property said aggregating controller;

said aggregating controller having associated with it a parent controller, said parent controller controlling a second group of business objects including as a property said parent controller;

said aggregating controller providing access, by object name, to said first and second groups of business objects in response to a client instantiation of a named object; and said aggregating controller and said parent controller occupying different hierarchical levels within said tree structure.

9. The framework according to claim 8, wherein said aggregating controller exhibits a hiding behavior, said hiding behavior selectively preventing instances of named objects within said first and second groups of business objects from being provided to said client.

* * * * *